US 9,253,467 B2

(12) United States Patent
Choo et al.

(10) Patent No.: US 9,253,467 B2
(45) Date of Patent: Feb. 2, 2016

(54) METHOD AND APPARATUS FOR CORRECTING ERRORS IN MULTIPLE STREAM-BASED 3D IMAGES

(71) Applicant: Electronics and Telecommunications Research Institute, Daejeon (KR)

(72) Inventors: Hyon Gon Choo, Daejeon (KR); Suk Hee Cho, Daejeon (KR); Jong Ho Kim, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/061,104

(22) Filed: Oct. 23, 2013

(65) Prior Publication Data
US 2014/0133739 A1    May 15, 2014

(30) Foreign Application Priority Data

Nov. 9, 2012    (KR) ........................ 10-2012-0126743

(51) Int. Cl.
*H04N 13/00* (2006.01)

(52) U.S. Cl.
CPC ........ *H04N 13/0059* (2013.01); *H04N 13/0048* (2013.01)

(58) Field of Classification Search
CPC .......... H04N 13/0048; H04N 13/0066; H04N 13/0059; H04N 13/0029; H04N 21/816; H04N 13/0022; H04N 13/004; H04N 21/2362; H04N 13/0452; H04N 13/0497; H04N 21/4345; H04N 21/4347; H04N 13/0051; H04N 13/0438; H04N 21/2365; H04N 2213/005; H04N 13/0239; H04N 21/23614; H04N 13/0003; H04N 13/0007; H04N 13/0011; H04N 2013/0081; H04N 9/8205; H04N 13/00; G06T 2207/10012; G06T 2207/10021

USPC ........................................................... 382/154
See application file for complete search history.

(56) References Cited

U.S. PATENT DOCUMENTS

| | | | |
|---|---|---|---|
| 2002/0047914 A1* | 4/2002 | Rosengren et al. | 348/384.1 |
| 2005/0128196 A1* | 6/2005 | Popescu et al. | 345/420 |
| 2010/0040153 A1* | 2/2010 | Imanaka et al. | 375/240.27 |
| 2010/0290483 A1* | 11/2010 | Park et al. | 370/472 |
| 2011/0150101 A1* | 6/2011 | Liu et al. | 375/240.26 |
| 2012/0242789 A1* | 9/2012 | Cheng et al. | 348/43 |
| 2014/0063184 A1* | 3/2014 | Chang | 348/43 |

FOREIGN PATENT DOCUMENTS

KR    1020110090640 A    8/2011

* cited by examiner

*Primary Examiner* — Edward Park
(74) *Attorney, Agent, or Firm* — William Park & Associates Ltd.

(57) ABSTRACT

The present invention relates to correcting errors of multiple stream-based 3D images. The present invention comprises a 3D image synchronizing unit which synchronizes a first image and a second image consisting the 3D image; a 3D image correcting unit which detects an error block in the first image, searches a corresponding block in the second image, and corrects the error block on the basis of the block information of said corresponding block; and a compositing unit which composites the corrected first image and the second image to generate a 3D stereoscopic image. According to the present invention, bit errors occurring when transmitting multiple stream of 3D image can be corrected, providing better quality of 3D images. Also, error correction can be easily performed by using the method of the present invention without complicated calculations.

19 Claims, 6 Drawing Sheets

METHOD AND APPARATUS FOR CORRECTING ERRORS IN MULTIPLE STREAM-BASED 3D IMAGES

Priority to Korean patent application number 10-2012-0126743 filed on Nov. 9, 2012, the entire disclosure of which is incorporated by reference herein, is claimed.

BACKGROUND OF THE INVENTION

1. Field of the Invention

The present invention relates to error correction of 3D images and, more particularly, to a method and apparatus for correcting errors of multiple stream-based 3D images.

2. Discussion of the Related Art

Recently, demands for 3 dimension (3D) images such as stereoscopic images and multi-viewpoint images are increasing among users, and the technology of 3D stereoscopic movie and 3D broadcasting is rapidly developing. In the case of 3D broadcasting technology, compatibility with existing broadcasting environment is essential and, for this purpose, methods for outputting multiple stream-based stereoscopic images have been developed.

The dual stream-based 3D TV can be an example in which the method of outputting multiple stream-based 3D image is applied. In the case of dual stream-based 3D TV, the image from the reference viewpoint (hereinafter, 'reference image') is encoded with MPEG-2 compression codec, which is used in conventional ground wave DTV (digital TV), and is output in the format of basic stream, while the image from the additional viewpoint (hereinafter, 'additional image') is encoded with high efficiency compression codec such as H.264, which shows high compression rate, and is output in the format of basic stream. The basic stream for the reference image and the basic stream for the additional image are multiplexed and transmitted in the format of transmission stream, and a receiving terminal receives the stream and performs decoding and synchronization to output the final 3D image.

In the case of multiple stream-based 3D image output method described above, images for some viewpoint can be broken when bit errors occur at the time of transmitting the transmission stream, causing problems in displaying the stereoscopic images in the receiving terminals. Especially, when bit error occurs while transmitting a transmission stream in stereoscopic 3D TVs of dual stream type which use different codecs, the chances of errors are higher in reference images which have larger data rates due to MPEG-2 encoding compared to the chances of errors in additional images which are encoded with high efficiency compression codec such as H.264. For this reason, errors are more prone to reference viewpoint images, reducing the quality of stereoscopic image.

SUMMARY OF THE INVENTION

One technical objective of the present invention is to provide a method and apparatus for correcting transmission error of multiple stream-based 3D images.

Another technical objective of the present invention is to provide a method and apparatus for correcting screen distortion resulting from bit errors when transmitting multiple stream-based 3D images.

Yet another technical objective of the present invention is to provide a method and apparatus for correcting screen distortion resulting from bit errors when transmitting multiple stream-based 3D images which use different codecs.

Still another technical objective of the present invention is to provide a method and apparatus for providing 3D images having better quality by correcting the errors in one image constituting a 3D image by using the other image.

According to one aspect of the present invention, 3D image correcting unit is provided. The 3D image correcting unit comprises an error block detector which determines error in the unit of block and detects error block in a first image consisting an 3D (3 dimension) image; a corresponding block searcher which searches a corresponding block that corresponds to the detected error block in a second image which consists the 3D image in connection with the first image; and an error corrector which corrects the error of the error block on the basis of the block information of the corresponding block.

According to another aspect of the present invention, 3D image processing unit is provided. The unit comprises a 3D image synchronizing unit which synchronizes a first image and a second image consisting the 3D image; a 3D image correcting unit which detects an error block in the first image, searches a corresponding block in the second image, and corrects the error block on the basis of the block information of the corresponding block; and a compositing unit which composites the corrected first image and the second image to generate a 3D stereoscopic image.

According to yet another aspect of the present invention, a method for processing 3D image is provided. The method comprises the steps of: synchronizing a first image and a second image consisting the 3D image; detecting an error block in the first image; searching a corresponding block which corresponds to the error block in the second image; correcting the error block on the basis of the block information of the corresponding block; and compositing the corrected first image and the second image to generate a 3D stereoscopic image.

According to the present invention, bit errors occurring when transmitting multiple stream of 3D image can be corrected, thereby providing better quality of 3D images. Also, error correction can be easily performed by using the method of the present invention without complicated calculations by performing correction of the error of one image constituting a 3D image on the basis of the other image.

DETAILED DESCRIPTION OF THE EMBODIMENTS

Some examples of the present invention will be described below in the specification with reference to illustrative drawings. It should be noted that each reference numerals in the drawings are to be meant to indicate the same element when the numeral is the same although present in different drawings. Also, in explaining the examples of the present invention in the specification, detailed description on the well-known constructing element or functions related to the invention will be omitted when the specific explanation can obscure the features of the present invention.

Also, if a component is referred to be "linked", "coupled" or "connected" to another component in describing construction component of the present invention, the component may be directly linked or connected to the other component, or a third component may intervene to "link", "couple" or "connect" the two components.

Figure 1:
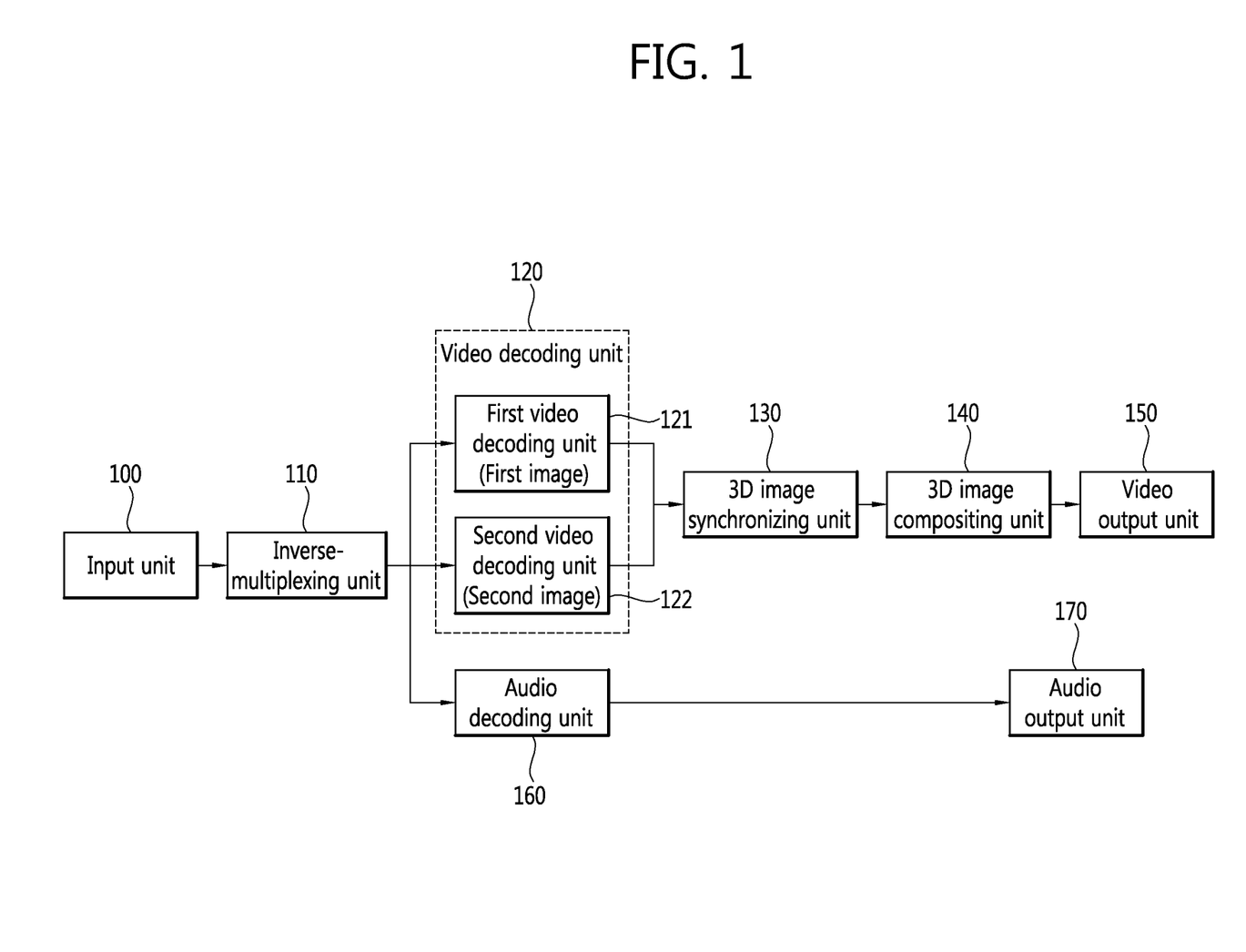
FIG. 1 is a block diagram illustrating a 3D image processing unit.

FIG. 1 is a block diagram illustrating a 3D image processing unit.

Referring to FIG. 1, the 3D image processing unit comprises an input unit 100, an inverse-multiplexing unit 110, a video decoding unit 120, a 3D image synchronizing unit 130, a 3D image compositing unit 140, a video output unit 150, an audio decoding unit 160 and an audio output unit 170.

The input unit 100 receives input of 3D images from outside. More specifically, the input unit 100 receives input of transmission stream including 3D image data, and transmits the input to an inverse-multiplexing unit.

The inverse-multiplexing unit 110 separates audio and video. More specifically, the inverse-multiplexing unit 110 can separate basic stream(s) on audio and basic stream(s) on video from the transmission stream and, in the case of 3D image broadcasting, can separate basic stream on multiple constituent videos (images).

The video decoding unit 120 decodes the basic stream(s) on video. The video decoding unit 120 can include a first video decoding unit 121 and a second video decoding unit 122. The first video decoding unit 121 can decode the basic stream on the first image constituting the 3D image to generate a first image (data), and the second video decoding unit 122 can decode the basic stream on the second image, which constitutes the 3D image and related to the first image, to generate a second image (data). For example, when the 3D image is consist of a dual stream with one basic stream on the reference image and the other basic stream on the additional image, the first video decoding unit 121 can decode the basic stream on the reference image to generate a reference image, and the second video decoding unit 122 can decode the basic stream on the additional image to generate on additional image.

The audio decoding unit 160 decodes the basic stream(s) on audio and generates audio (data), and the audio output unit 170 outputs the audio data generated.

The 3D image synchronizing unit 130 synchronizes the decoded first image and the second image at the video decoding unit 120.

The 3D image compositing unit 140 generates 3D image (data) on the basis of the synchronized first and second images, and outputs the images on a display means through the video output unit 150. The 3D image compositing unit 140 generates the 3D image data in the format of side-by-side or frame packing depending on the format supported by the video output unit 150, and outputs the images on a displaying means through the video output unit 150.

For example, the first image can be a reference image and the second image an additional image. When the first video decoding unit 121 decodes the basic stream on the reference image to generate a reference image and the second video decoding unit 122 decodes the basic stream on the additional image to generate an additional image, MPEG-2 video encoding method can be used at the first video decoding unit 121 and encoding methods producing high quality video such as H.264 or HEVC (High Efficiency Video Coding) can be used at the second video decoding unit 122. The H.264 video encoding method generally shows two times higher compression efficiency compared to MPEG-2 video encoding method, and the HEVC video method shows four times higher compression efficiency compared to MPEG-2 video method. Therefore, when a broadcasting station (server) transmits dual stream-based 3D image broadcasting, H.264 encoded stream can have 12 Mbps of data rates if MPEG-2 encoded stream has 6 Mbps of data rates. In other words, under the same channel noise environment, the chances of error when transmitting MPEG-2 encoded data is about two times higher compared to the chances of error when transmitting H.264 encoded data.

The present invention, considering the features that occurrence of errors in multiple images constituting a 3D image is not homogeneous among images, proposes a method of enhancing the quality of 3D images by correcting (or compensating) the error of one image by using the other image in which error has not occurred from multiple images constituting a 3D image.

Figure 2:
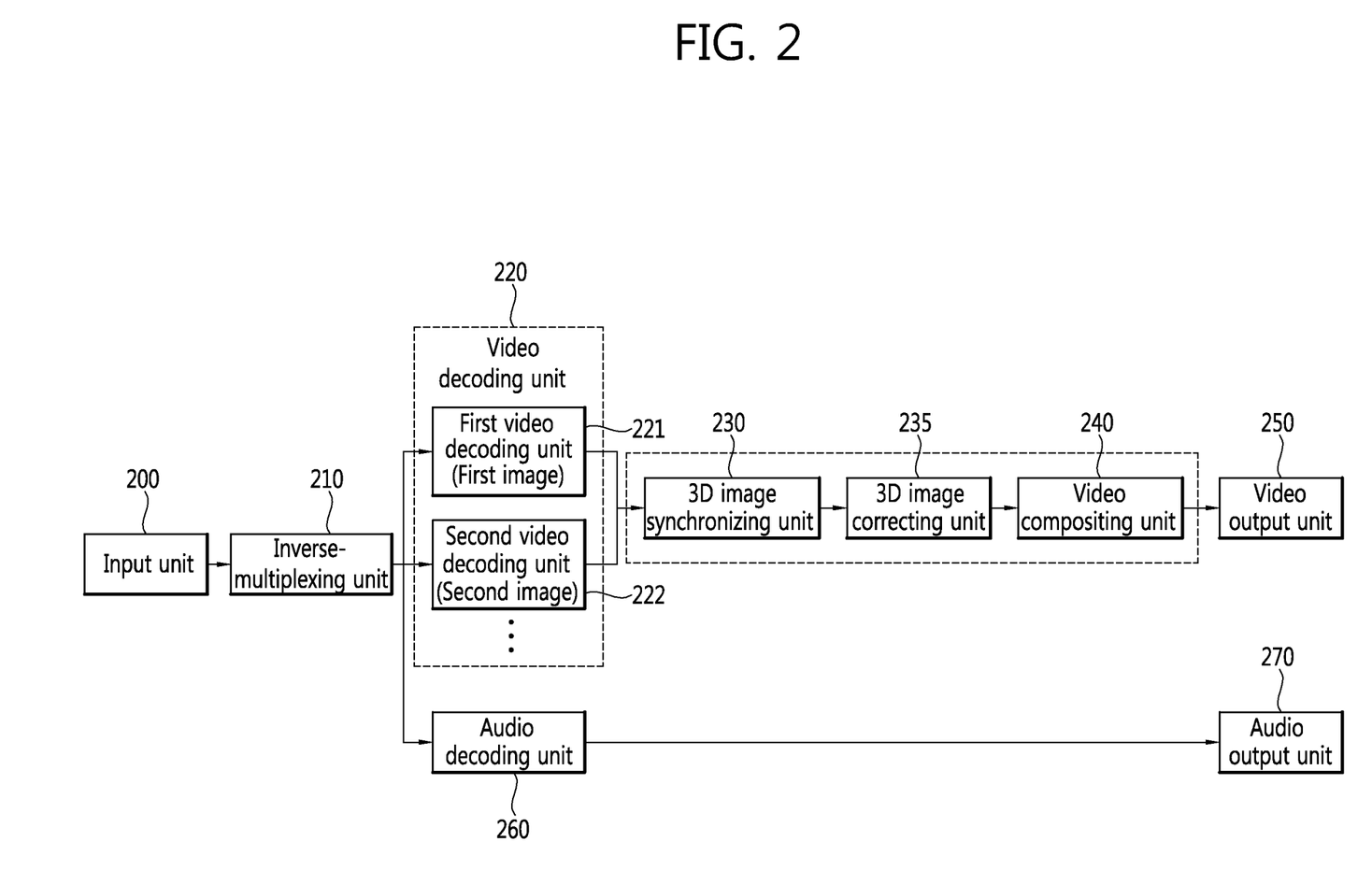
FIG. 2 is a block diagram illustrating a 3D image processing unit according to one example of the present invention.

FIG. 2 is a block diagram illustrating a 3D image processing unit according to one example of the present invention.

Referring to FIG. 2, the 3D image processing unit according to the present invention comprises an input unit 200, an inverse-multiplexing unit 210, a video decoding unit 220, a 3D image synchronizing unit 230, a 3D image correcting unit 235, a 3D image compositing unit 240, a video output unit 250, an audio decoding unit 260 and an audio output unit 270. The video decoding unit 220 includes a first video decoding unit 221 and a second video decoding unit 222. The operations of the input unit 200, the inverse-multiplexing unit 210, the video decoding unit 220, the 3D image synchronizing unit 230, the audio decoding unit 260 and the audio output unit 270 are the same as the operations of the devices described with reference to FIG. 2 and detailed explanation is omitted.

The 3D image processing unit according to the present invention further includes a 3D image correcting unit 235. The 3D image correcting unit 235 performs the step of error correction on the basis of the first and second images synchronized at the 3D image synchronizing unit 230. The step of error correction includes checking the error and, when error is detected, correcting the error of the data of the image which contains the error on the basis of other image in which error is not detected. When error is detected in the first image (or one block of the first image), for example, the error in the first image (or one block of the first image) can be corrected on the basis of the second image (or corresponding block of the second image). When error is detected in the second image (or one block of the second image), as another example, the error in the second image (or one block of the second image) can be corrected on the basis of the first image (or corresponding block of the first image).

The 3D image compositing unit 240 generates a 3D image on the basis of the reference image and additional image for which error correction has been performed, and outputs the 3D image on a display means through the video output unit 150.

The process of correcting errors performed at the 3D image correcting unit 235 can be performed as follows.

Figure 3:
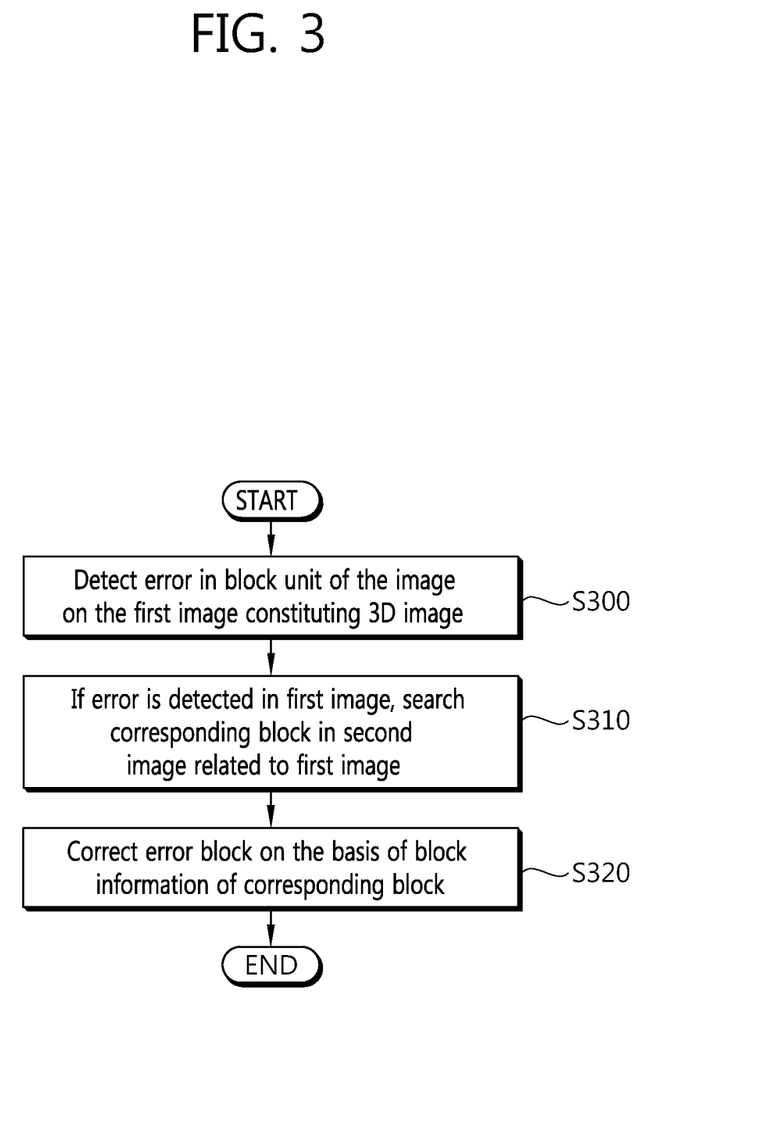
FIG. 3 is a flow diagram illustrating the process of error correction by the 3D image correcting unit according to one example of the present invention.

FIG. 3 is a flow diagram illustrating the process of error correction by the 3D image correcting unit according to one example of the present invention. In the description below, the case where error is detected in the first image among multiple images constituting the 3D image will be described as an example. It is obvious that the first image can be one arbitrary image of multiple images 3D image. For example, the first image can be a reference image constituting the stereoscopic image or the first image can be an additional. Also, when three or more images constitute the 3D image, for example, the first image can be one of the three or more images.

Referring to FIG. 3, the 3D image correcting unit detects (or checks) errors on the first image constituting a 3D image in block unit (or pixel unit) of the image (S300). The error detection can be performed by using the characteristics of the basic stream of corresponding image itself or can be performed by comparing the pixel values of corresponding image decoded or by comparing the values of pixel blocks.

As one example, if the first image is a reference image encoded by MPEG-2, the 3D image correcting unit can detect errors by comparing the level (value) in macro block unit of n×n pixels (for example 8×8 pixels) on the image decoded by MPEG-2. Explaining more specifically, DC (Direct Current) coefficient included in DCT (Discrete Cosine Transform) coefficient as respective macro block unit of decoded image data is compared with DC coefficients of adjacent blocks to check whether the coefficient is within a certain range of values, and if the coefficient is not within the certain range of values, the macro block can be determined to contain errors. In other words, after extracting DC of each macro block unit, DC level of one block is compared to those of adjacent blocks and if the DC level is not within a certain range, the block can be detected (or determined) as an error block in which an error is occurred. In this case, the 3D image correcting unit can detect error blocks in the way shown in table 1.

TABLE 1 y=FindMostSimiliarBlock(x,Neighbor(x))
if(dis(x,y)>T), x is an error-occurred block
else, x is a normal block Referring to table 1, x represents a certain block and Neighbor(x) adjacent blocks around x (for example 8 blocks surrounding the block x). In the table, y represents the block among the adjacent blocks represented by Neighbor(x), which is most similar to the block x in DC level. Also, dis(x,y) represents the distance of similarity between the DC level of block x and the DC level of block y, and T represents the value of certain limit. In other words, the block x can be determined as an error block if the distance of similarity between the DC level of block y, which is the adjacent block with the closest DC level to the block x, and the DC level of block x is larger than the limit value of T.

When the 3D image correcting unit detects error in macro block unit, detection of error can be easily performed with shorter time for correction.

When the 3D image correcting unit detects an error block (or pixel) containing an error in the first image, the unit searches a corresponding block (or pixel) which corresponds to the error block in the second image related to the first image (S310).

When the first image is a reference image decoded by MPEG-2 and the second image is an additional image decoded by H.264 (or HEVC), for example, and if an error block is detected in the macro block unit of n×n pixels (for example, 8×8 pixels) on the reference image, comparison can be made on the macro block unit of n×n pixels (for example, 8×8 pixels) on the additional image.

First, the 3D image correcting unit calculates correlation between the macro blocks on the first image and the macro blocks on the second image related to the first image to calculate disparity at the block unit. The calculation of correlation between the macro blocks on the first image and the macro blocks on the second image can be performed by using general 3 dimensional stereo matching method. As one example, DC level (value) of each block can be used as the value of each block of the macro blocks of the first image and the macro blocks of the second image.

For example, considering each block as one pixel, disparity between two blocks can be represented as Mathematical formula 1, and the value of disparity can be calculated by using the value with the minimum cost among adjacent pixels.

$$E(x,y,d)=|I_1(x+d,y)-I_2(x,y)|$$ [Mathematical formula 1]

Referring to Mathematical formula 1, $I_1$ is the value of the block (or pixel) of the first image, $I_2$ the block (or pixel) of the second image, (x, y) a variable representing the spatial coordinate of blocks (or pixels), d the disparity representing spatial distance between two corresponding blocks (or pixels) and E the cost. The 3D image correcting unit can calculate the value of disparity by using the value with minimum cost on the basis of the Mathematical formula 1.

Then, the 3D image correcting unit can search corresponding block in the second image, in which error has not been occurred, by using disparities of blocks excluding error block of the first image (for example, reference image), in which the error has occurred, and the blocks of the second image (for example, additional image) related to the first image.

Figure 4:
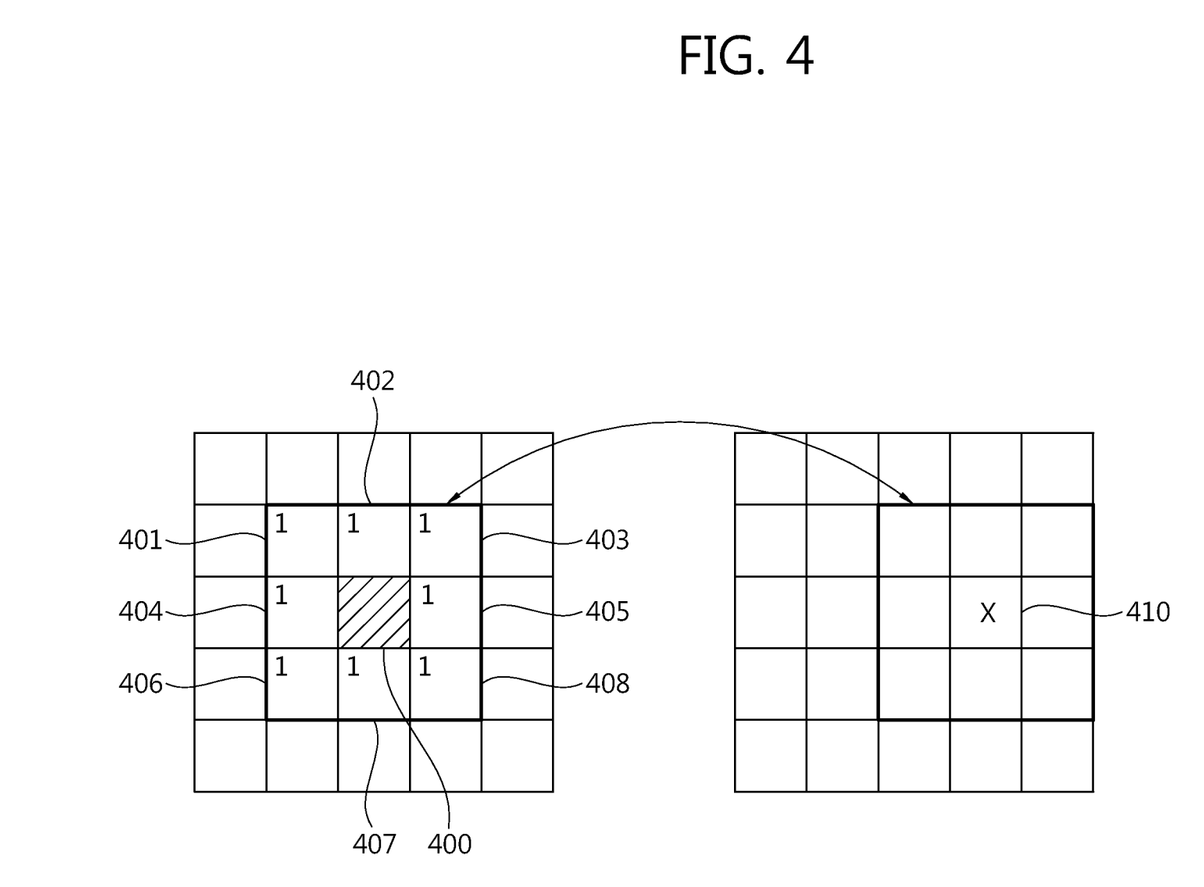
FIG. 4 illustrates the process of searching the block corresponding to an error block according to one example of the present invention.

FIG. 4 illustrates the process of searching the block corresponding to an error block according to one example of the present invention. In the figure, it is assumed that (a) represents the macro blocks on the first image and (b) represents the macro blocks on the second image.

In FIG. 4, assuming that the area with oblique lines in (a), which is the blocks on the first image, is an error block 400, corresponding block 410 can be searched in (b), which is the blocks on the second image, through the disparities of adjacent blocks (401, 402, 403, 404, 405, 406, 407, 408).

Referring to FIG. 3 again, the 3D image correcting unit corrects the error block (or pixel) of the first image, in which an error has occurred, on the basis of the block (or pixel) information of the corresponding block (or pixel) related to the first image (S320). Here, correction of the block in which an error has occurred includes correcting the error pixel in the block in which the error has occurred. The 3D image correcting unit can correct the error block on the basis of the block information of the corresponding block when the amount of disparity change of the error block and the amount of disparity change of the corresponding block is not similar. In other words, the 3D image correcting unit can correct the error block on the basis of the block information of the corresponding block when the difference between the amount of disparity change, which is measured between the adjacent blocks of said error block and said error block, and the amount of disparity change, which is measured between the adjacent blocks of said corresponding block and said corresponding block, is greater than a certain value. Here, the amount of disparity change can mean the amount of disparity change between the corresponding block and adjacent blocks.

In the above one example, when the value of disparity at the same block of previous frame exists in the step of searching the corresponding block, the value can be used for reference. For example, when the value of a block except the error block is similar to the value of previous frame, the value of disparity calculated in previous frame can be used as the value of disparity of current block.

Also, the 3D image correcting unit can correct the error block on the basis of the color of the corresponding block or the difference in colors with adjacent blocks of the corresponding block when the difference in colors of the error block and adjacent blocks of the error block is not similar to the difference in colors of the corresponding block and adjacent blocks of the corresponding block.

The 3D image correcting unit can correct the error block by simply copying the color of the corresponding block to the error block, or can correct the error block on the basis of the difference in colors between the corresponding block and adjacent blocks of the corresponding block.

Figure 5:
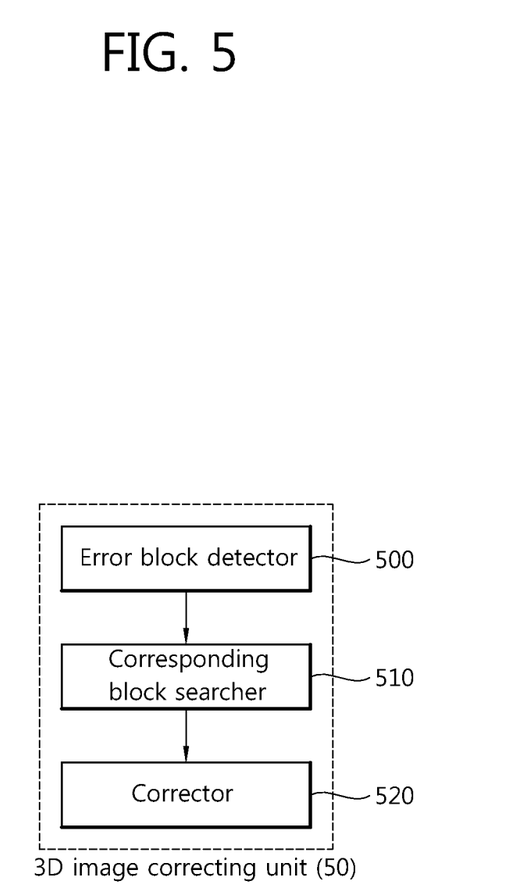
FIG. 5 is a block diagram illustrating a 3D image processing unit according to one example of the present invention.

FIG. 5 is a block diagram illustrating a 3D image processing unit according to one example of the present invention.

Referring to FIG. 5, the 3D image correcting unit 50, which performs error correction on the first and second images constituting the 3D image, includes an error block detector 500, a corresponding block searcher 510 and a corrector 520.

The error block detector 500 determines errors of the first image in block unit and detects an error block. The error block detector 500 can detect an error block by extracting DC level from the macro block unit of n×n pixels of the first image and comparing DC level of a certain block to DC level of adjacent blocks. For example, the macro block unit of n×n pixels of the first image includes the case of the macro block unit of 8×8 pixels of the first image. Also, the error block detector 500 can detect a certain block as the error block when the difference of the DC level of the certain block and the DC level of the block having the DC level which is closest to the DC level of the certain block among the adjacent blocks of the certain block is greater than predetermined limit, as described in table 1.

The corresponding block searcher 510 searches the corresponding block which corresponds to the error block detected in the second image. The corresponding block searcher 510 can calculate the disparity at the macro block unit of n×n pixels of the first image and the macro block unit of n×n pixels of the second image, and search the corresponding block in the second image on the basis of the disparity at the block unit. In this case, the corresponding block searcher 510 can calculate the disparity by using the Mathematical Formula 1.

The corrector 520 corrects the error of the error block on the basis of the block information of the corresponding block. The corrector 520 can correct the error block by copying the colors of the corresponding block to the error block. Also, the corrector 520 can correct the error block on the basis of the difference in colors between the corresponding block and adjacent blocks of the corresponding block.

Figure 6:
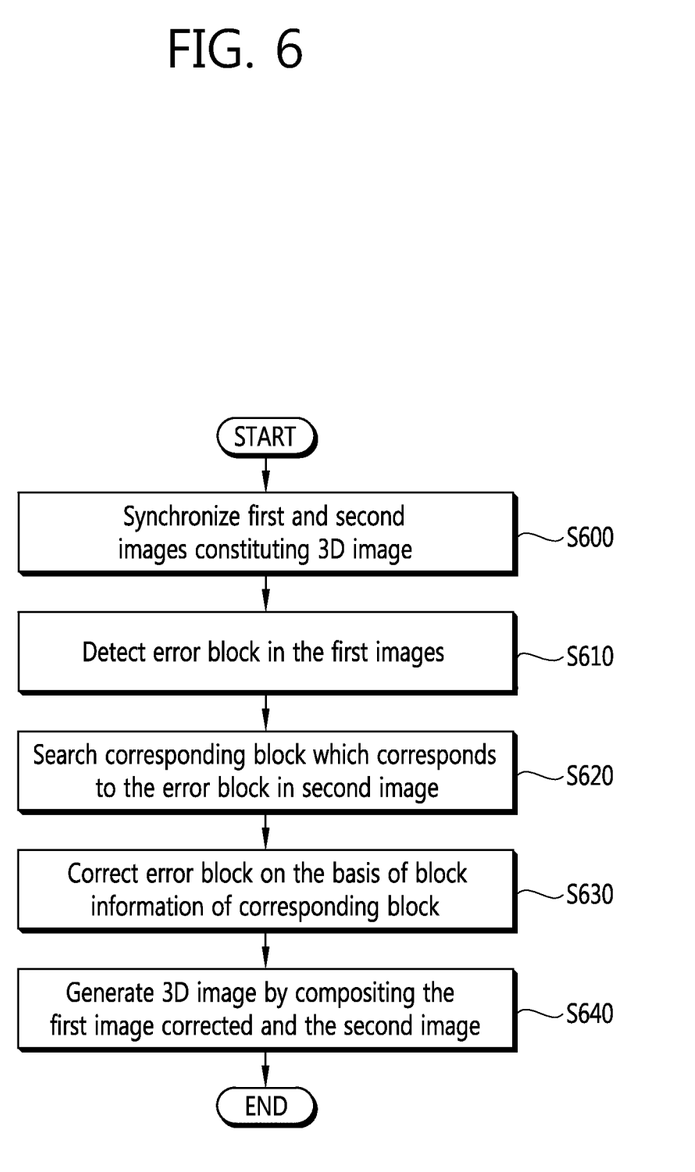
FIG. 6 illustrates the process of processing a 3D image according to one example of the present invention.

FIG. 6 illustrates the process of processing a 3D image according to one example of the present invention.

The 3D image processing unit synchronizes the first and second images constituting the 3D image (S600).

The 3D image processing unit detects an error block in the first image (S610). The 3D image processing unit extracts DC level from macro block unit (for example, macro block unit of 8×8 pixels) of n×n pixels of the first image, and can detect the error block by comparing DC level of a certain block to DC level of adjacent blocks. For example, as described with respect to table 1, the 3D image processing unit can detect a certain block as the error block when the difference of the DC level of the certain block and the DC level of the block having the DC level which is closest to the DC level of the certain block among the adjacent blocks of the certain block is greater than predetermined amount.

The 3D image processing unit searches the corresponding block which corresponds to the error block in the second image (S620). The 3D image processing unit, in searching the corresponding block, can calculate the disparity at the macro block unit of n×n pixels of the first image and the macro block unit of n×n pixels of the second image, and can search the corresponding block in the second image on the basis of the disparity at the block unit. In this case, the 3D image processing unit can calculate the disparity by using the Mathematical Formula 1 described above.

The 3D image processing unit corrects the error block on the basis of the block information of the corresponding block (S630). The 3D image processing unit can correct the error block by copying the colors of the corresponding block to the error block. Also, the 3D image processing unit can correct the error block on the basis of the difference in colors between the corresponding block and adjacent blocks of the corresponding block. Also, the 3D image correcting device can correct the error block on the basis of the block information of the corresponding block only when the difference between the amount of disparity change, which is measured between the adjacent blocks of the error block and the error block, and the amount of disparity change, which is measured between the adjacent blocks of the corresponding block and the corresponding block, is greater than predetermined value. Also, the 3D image processing unit can correct the error block on the basis of the color of the corresponding block or the difference in colors with adjacent blocks of the corresponding block when the difference in colors of the error block and adjacent blocks of the error block is not similar to the difference in colors between the corresponding block and adjacent blocks of the corresponding block.

The 3D image processing unit generates the 3D image by compositing the first image the error block corrected and the second image (S640). The 3D image processing unit can generate a 3D image with error corrected.

The devices and the system including thereof can be implemented by hardware, software and the combination thereof. In the case of hardware implementation, the module used for recording broadcast program can be implemented by one or more application specific IC (ASIC), digital signal processor (DSP), digital signal processing unit (DSPD), programmable logic device (PLD), field programmable gate array (FPGA), processor, controller, micro-controller, microprocessor, or other electronic unit designed to perform the functions described in the specification, or by combination thereof. Software can be used to implement the module performing the functions described in the specification. Software codes can be stored in a memory unit and executed by a processor. The memory unit can be implemented inside or outside the processor, and when implemented outside the processor, the memory can be connected to the processor through well-known connecting means.

Meanwhile, the method of the present invention described above can be implemented by a computer program. And the code or code segment constituting the program can be easily inferred by computer programmers in the field. Also, the produced computer program can be stored in recording media (information storing media) that can be read by a computer, and executed by the computer, thereby implementing the method of the present invention. And, the recording media include all forms of recording media that can be read by a computer (including intangible media such as carrier wave as well as tangible media such as CD and DVD).

It should be appreciated that the above description has been made to illustrate the technical idea of the present invention, and can be corrected and modified within the scope of the essential features of the present invention by those skilled in the art to which the present invention pertains to. Therefore, the examples in the specification of the present invention should be considered not to limit the technical idea of the present invention but illustrate the present invention. In sum, and the present invention shall not be limited by the examples but shall be interpreted by the claims attached in terms of the scope of the invention, and any technical ideas equivalent to that of the present invention shall be considered to be within the scope of the present invention.

What is claimed is:

1. A 3D image correcting unit which comprises:
an error block detector which determines error in the unit of block and detects error block in a first image consisting an 3D (3 dimension) image;
a corresponding block searcher which searches, with a processor, a corresponding block that corresponds to said detected error block in a second image which consists said 3D image in connection with said first image; and
an error corrector which corrects, with a processor, the error of said error block on the basis of the block information of said corresponding block,
wherein the first image is a reference image of the 3D image and the second image is an additional image of the 3D image,
wherein the first image and the second image are decoded by separated decoders particularly,
wherein the 3D image is generated by synchronization and composition of the first image and the second image, and
wherein the 3D image correcting unit is configured to correct the error block on the basis of the block information of the corresponding block when a difference between an amount of disparity change measured between adjacent blocks of the error block and the error block, and an amount of disparity change measured between adjacent blocks of the corresponding block and the corresponding block is greater than a predetermined value.

2. The 3D image correcting unit of claim 1, wherein said error block detector extracts direct current (DC) level from the macro block unit of n.times.n pixels of said first image, and detects said error block by comparing the DC level of one block to the DC level of adjacent blocks.

3. The 3D image correcting unit of claim 2, wherein said error block detector detects a certain block as said error block when the difference of the DC level of said certain block and the DC level of the block having the DC level which is closest to the DC level of said certain block among the adjacent blocks of said certain block is greater than predetermined amount.

4. The 3D image correcting unit of claim 2, wherein said error block detector extracts said DC level from the macro block unit of 8.times.8 pixels of said first image.

5. The 3D image correcting unit of claim 1, wherein said corresponding block searcher calculates the disparity at the macro block unit of n.times.n pixels of said first image and the macro block unit of n.times.n pixels of said second image, and searches said corresponding block in said second image on the basis of said disparity at said block unit.

6. The 3D image correcting unit of claim 1, wherein said error corrector corrects said error block by copying the color of said corresponding block to said error block.

7. The 3D image correcting unit of claim 1, wherein said error corrector corrects said error block on the basis of the difference of colors between said corresponding block and the adjacent blocks of said corresponding block.

8. A 3D image processing unit, which comprises:
a 3D image synchronizing unit which synchronizes, with a processor, a first image and a second image consisting the 3D image;
a 3D image correcting unit which detects, with a processor, an error block in said first image, searches a corresponding block in said second image, and corrects said error block on the basis of the block information of said corresponding block; and
a compositing unit which composites, with a processor, said corrected first image and said second image to generate a 3D stereoscopic image,
wherein the first image is a reference image of the 3D image and the second image is an additional image of the 3D image,
wherein the first image and the second image are decoded by separated decoders particularly, and
wherein said 3D image correcting unit corrects the error block on the basis of the block information of the corresponding block when a difference between the amount of disparity change 1, which is measured between the adjacent blocks of the error block and the error block, and the amount of disparity change 2, which is measured between the adjacent blocks of the corresponding block and the corresponding block, is greater than a predetermined value.

9. The 3D image processing unit of claim 8, wherein said 3D image correcting unit extracts DC level from the macro block unit of n.times.n pixels of said first image, and detects said error block by comparing the DC level of one block to the DC level of adjacent blocks.

10. The 3D image processing unit of claim 9, wherein said 3D image correcting unit detects a certain block as said error block when the difference of the DC level of said certain block and the DC level of the block having the DC level which is closest to the DC level of said certain block among the adjacent blocks of said certain block is greater than predetermined amount.

11. The 3D image processing unit of claim 8, wherein said 3D image correcting unit calculates the disparity at the macro block unit of n.times.n pixels of said first image and the macro block unit of n.times.n pixels of said second image, and searches said corresponding block in said second image on the basis of said disparity at said block unit.

12. The 3D image processing unit of claim 8, wherein said 3D image correcting unit corrects said error block by copying the color of said corresponding block to said error block.

13. The 3D image processing unit of claim 8, wherein said 3D image correcting unit corrects said error block on the basis of the difference of colors between said corresponding block and the adjacent blocks of said corresponding block.

14. A method for processing a 3D image, which comprises the steps of:
synchronizing a first image and a second image consisting said 3D image;
detecting an error block in said first image;
searching a corresponding block which corresponds to said error block in said second image;
correcting said error block on the basis of the block information of said corresponding block; and
compositing said corrected first image and said second image to generate a 3D stereoscopic image,
wherein the first image is a reference image of the 3D image and the second image is an additional image of the 3D image,
wherein the first image and the second image are decoded by separated decoders particularly, and
wherein correcting the error block on the basis of the block information of the corresponding block further comprises correcting the error block on the basis of the block information of the corresponding block when a difference between an amount of disparity change measured between adjacent blocks of the error block and the error block, and an amount of disparity change measured between adjacent blocks of the corresponding block and the corresponding block is greater than a predetermined value.

15. The method of claim 14, wherein said step of detecting an error block includes the step of extracting DC level from the macro block unit of n.times.n pixels of said first image and detecting said error block by comparing the DC level of one block to the DC level of adjacent blocks.

16. The method of claim 15, wherein said step of detecting an error block includes the step of detecting a certain block as said error block when the difference of the DC level of said certain block and the DC level of the block having the DC level which is closest to the DC level of said certain block among the adjacent blocks of said certain block is greater than predetermined amount.

17. The method of claim 14, wherein said step of correcting an error block includes the step of calculating the disparity at the macro block unit of n.times.n pixels of said first image and the macro block unit of n.times.n pixels of said second image and searching said corresponding block in said second image on the basis of said disparity at said block unit.

18. The method of claim 14, wherein said step of correcting an error block includes the step of correcting said error block by copying the color of said corresponding block to said error block.

19. The method of claim 14, wherein said step of correcting an error block includes the step of correcting said error block on the basis of the difference of colors between said corresponding block and the adjacent blocks of said corresponding block.

* * * * *